United States Patent [19]

Schwartz

[11] Patent Number: 4,468,969
[45] Date of Patent: Sep. 4, 1984

[54] PRESSURE INDICATOR PARTICULARLY FOR RESPIRATORS

[75] Inventor: Willi Schwartz, Lübeck, Fed. Rep. of Germany

[73] Assignee: Drägerwerk Aktiengesellschaft, Fed. Rep. of Germany

[21] Appl. No.: 470,306

[22] Filed: Feb. 28, 1983

[30] Foreign Application Priority Data

Mar. 17, 1982 [DE] Fed. Rep. of Germany ....... 3209601

[51] Int. Cl.³ .............................................. G01L 7/16
[52] U.S. Cl. .................................... 73/744; 116/272; 116/281
[58] Field of Search ...................... 73/744, 745, 146.2, 73/146.3, 146.8, 756; 116/272, 205, 281, DIG. 17; 200/81.4

[56] References Cited

U.S. PATENT DOCUMENTS 1,924,633  8/1933  Whittington et al. ............. 200/81.4
3,705,535  12/1972  Cohen et al. ........................ 200/81.4
3,952,284  4/1976  Martin ................................ 200/81.4

FOREIGN PATENT DOCUMENTS 1299533  7/1969  Fed. Rep. of Germany ........ 73/744

Primary Examiner—Donald O. Woodiel
Attorney, Agent, or Firm—McGlew and Tuttle

[57] ABSTRACT

A pressure indicator, particularly for respirators, comprises a housing which has a pressure chamber, is connectable to a pressure source, for example a respirator gas pressure and includes a plurality of individual indicator chambers which is connected to the pressure chamber with an indicator piston member slidable in each of the chambers and biased by individual springs in a direction which brings a feeler portion of the indicator piston member within the housing. The feeler portion extends out of the housing in an indicating position which position is arrived at by pressure in the pressure chamber acting on the indicator piston to force it out of the housing. Each indicator piston member is biased by a biasing force, for example, produced by a selected spring so that it will be in a non-indicating position until a distinct pressure acts on the indicator piston member to force it in a position in which the feeler portion thereof extends out of the housing. The individual feeler portions of the indicator piston members are advantageously covered by a flexible covering which is provided with individual projecting portions which provide housings for the feeler members. The covering is such that the individual feelers may be sensed as being present in the projecting portions of the covering when the pressure chamber of the device has reached a predetermined pressure and forces this particular feeler into the projection.

6 Claims, 2 Drawing Figures

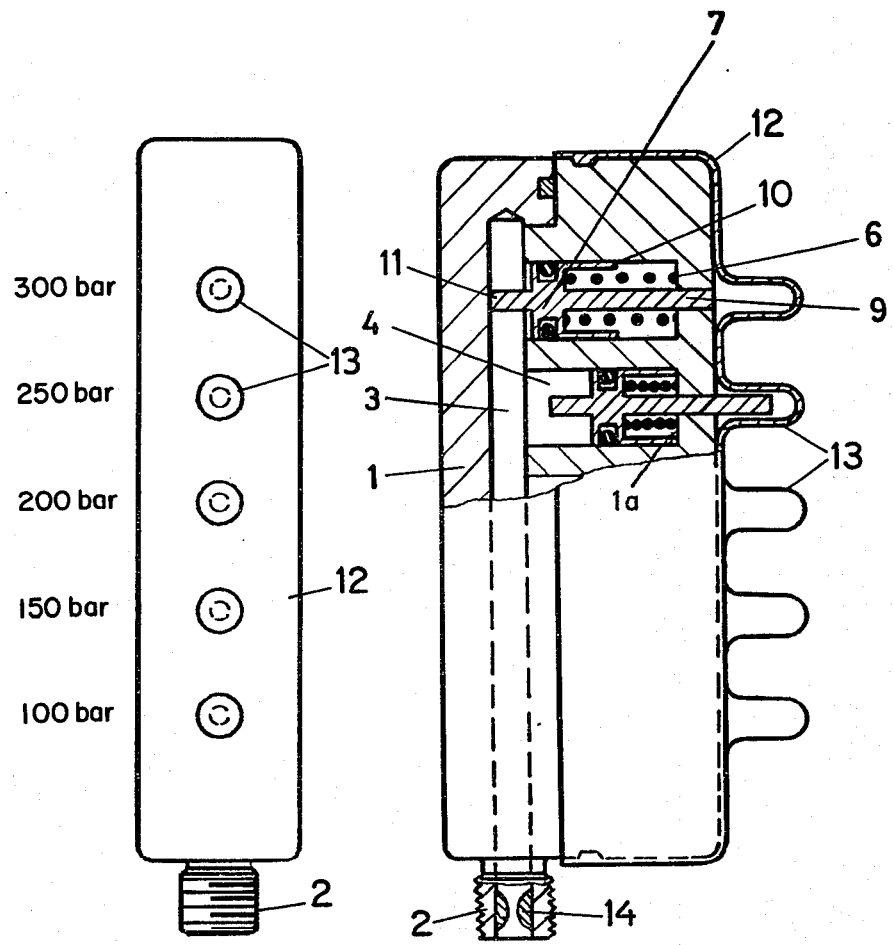

PRESSURE INDICATOR PARTICULARLY FOR RESPIRATORS

BACKGROUND OF THE INVENTION

Field of the Invention

This invention relates, in general, to respirators and, in particular, to a new and useful pressure indicator for respirators which provides a pressure indication which can be sensed in darkened conditions.

Respirators with pressure gas tanks containing the ventilating gas are equipped with a pressure measuring instrument to monitor the pressure in the tanks, and thus also the supply of the ventilating gas. This monitoring must also be possible in dark rooms or in great depth in water.

A known pressure indicator for respirators contains in the same housing in addition to a pointer, another pointer admitted by the same pressure. It is a displaceable piston which is under spring pressure and which has an outwardly protruding indicating pin. The indicating pins are provided with elevations or depressions, like grooves, which correspond to the pressure stages. They can be recognized by feeling. This is also possible in the dark or under water. Since the stroke of the indicating pin is small, however, the markings are so close together that a reliable recognition is not possible, and errors cannot be excluded. This is particularly true when working with gloves (German Pat. No. 1,299,533).

SUMMARY OF THE INVENTION

The invention provides a pressure indicator for respirators which makes it possible to reliably recognize, by feeling, the pressure in the pressure gas tank, even in the dark.

In accordance with the invention, the pressure indicator includes a pressure chamber which is connected to a plurality of individual indicator chambers each of which has an indicator piston member which is movable therein. The individual indicator pistons are biased by pressures, for example, produced by a combination of the sizing of the piston and the size of a biasing spring which permit them to move in a direction away from the pressure chamber so as to project out of the housing into an indicating position only when the pressure chamber reaches the distinct pressure at which the biasing means are set. Thus, when an individual pressure is arrived at in the pressure chamber which corresponds to the biasing of the particular indicator piston member, it will be moved in its associated chamber so as to project with a portion out of the housing. This portion comprises a feeler which enters into a protuberance formed by a covering on the exertior of the housing so that it may be felt by a person to show the pressure at which the indicator is connected.

The feelers provided in the pressure stages permit a completely reliable feeling by the user with gloves, even in the dark. The user determines which feelers have already entered the housing, and knows then the pressure gas supply. Even great contaminations do not interfere with this determination.

Accordingly, it is an object of the invention to provide a pressure indicator which may be used to indicate pressure and which may be sensed in darkened conditions.

A further object of the invention is to provide a pressure indicator which includes a plurality of feeler members which are moved out of a pressure housing which is connectable to the pressure source and which are set to move out of the housing at distinct pressures and which may be felt as an indication of the pressure which is connected to the indicator.

A further object of the invention is to provide a pressure indicator which is simple in design, rugged in construction and economical to manufacture.

For an understanding of the principles of the invention, reference is made to the following description of a typical embodiment thereof as illustrated in the accompanying drawings.

BRIEF DESCRIPTION OF THE DRAWINGS

In the Drawings

FIG. 1 is a partial sectional and partial side elevational view of a pressure indicator constructed in accordance with the invention; and FIG. 2 is an end elevational view of the indicator shown in FIG. 1.

GENERAL DESCRIPTION OF THE PREFERRED EMBODIMENTS

Referring to the drawings, in particular, the invention embodied therein comprises a pressure indicator having a housing 1 with a pressure chamber 3 therein which is connectable to a pressure course through a connection tube. A plurality of individual indicator chambers 4 are provided in the housing which communicate with the pressure chamber 3 and, in accordance with the invention, an indicator piston member 7 is slidable in each of the individual chambers. The indicator position member 7 has a feeler portion 9 which, in an indicating position, extends out of the housing 1 and in a non-indicating position is located inside the housing. The indicator piston member 7 includes an end portion 11 which is exposed to the pressure of the pressure chamber 3. Biasing means, such as spring 6, in combination with a selected piston size of the piston member 7, bias each respective indicator piston member 7 at a distinct pressure in a direction to urge the member toward a non-indicating position at which the feeler portion 9 extends entirely within the housing as indicated in the upper portion of FIG. 1. Each of the indicator piston member 7 is movable against the biasing means to an indicating position, such as shown at the lower portion of FIG. 1 in which the feeler portion 9 extends out of the housing in a position at which it may be felt by a person's finger. This shows that the chamber 3 has arrived at the pressure corresponding to the biasing means associated with the particular feeler and a selected pressure has been achieved, such as indicated to the left-hand side of FIG. 2.

Housing 1 contains a pressure chamber 3 to be connected over a connection 2 with the pressure tank. Connected to pressure chamber 3 are piston pressure meters 4 for the pressure stages to be determined. The meters 4 include a cylinder 5 in which a pressure piston 7 is sealingly guided and is movable against the biasing force of a calibrated compression spring 6. The pistons 7 are sealed with the cylinder by sealing rings 8. Each piston has a feeler 9 which is completely retracted into housing 1 by the compression spring 6 in a relaxed condition, but which protrude out of the housing when the compression spring 6 is compressed. The path of pressure piston 7 is limited by an extension (10) bearing against housing ledge 1a in the indicating position and by a stop 11 in a non-indicating position.

A hood 12 of elastic material protects piston pressure meters 4 against fouling and and has covering projections or knobs 13 which receivers feelers 9.

A throttle 14 in connection 2 limits the amount of pressure gas when housing 1 is not tight. The pressure stages, hence the pressure values to be monitored, are determined either by different size pistons 7 or different force compression springs 6 exerting the counterpressure. The spring forces are adapted to the respective lower and upper limit value of the pressure stage to be monitored. At a pressure of 250 bar, e.g. feeler 9 of pressure piston 7 for pressure stage 250 to 300 bar is thus completely retracted into housing 1, with compression spring 6 relaxed, until it is stopped by stop 11. At the same time, pressure piston 7 for pressure stage 200 to 250 bar, with compression spring 6 compressed, is limited in its path by extension 10, is still completely forced into cylinder 5 and feeler 9 has completely emerged from housing 1 and the feeler 9 is contained in knob 13. By feeling and pressing knobs 13, it is readily possible to determine the presence of feelers 9 by the carrier of the respirator.

While a specific embodiment of the invention has been shown and described in detail to illustrate the application of the principles of the invention, it will be understood that the invention may be embodied otherwise without departing from such principles.

What is claimed is:

1. A pressure indicator particularly for respirators, comprising a housing having a pressure chamber connectable to a pressure source, a plurality of individual indictor chambers connected to said pressure chamber in said housing, an indicator piston member slidable in each of said indicator chambers, and having a feeler portion which, in an indicating position, extends out of said housing and a non-indicating position is located entirely within said housing, said indicator piston member having a portion exposed to the pressure of said pressure chamber, biasing means biasing each respective indicator piston member at a distinct pressure in a direction to urge said indicator piston member toward a non-indicating position, each indicator piston member being movable against said biasing means at a pressure corresponding to its distinct biasing means pressure to an indicating position extending out of said housing.

2. A pressure indicator according to claim 1, wherein said biasing means comprises a compression spring having different compression forces for each of said indicator piston members.

3. A pressure indicator according to claim 1, including stop means limiting the path of movement of said indicator piston member in its associated indicator chamber, said indicator piston member having an end portion which extends into said pressure chamber in a non-indicating position and abuts against a wall thereof.

4. A pressure indicator, according to claim 1, wherein each of said indicator chambers extends at an angle to the associated pressure chamber and they are arranged in a row, said feeler portions of said indicator piston members projecting out of said housing in an ascending row or, according to rising pressures.

5. A pressure indicator according to claim 1, including a hood extending over the exterior of said housing and covering said indicated chambers and including a projecting portion formed in said hood overlying each of said chambers into which a feeler portion of said indicator piston members extends.

6. A pressure indicator according to claim 1, including a connection to said housing connected into said pressure chamber for connecting the pressure chamber to a pressure source having a throttle therein for limiting the flow therethrough into said pressure chamber.

* * * * *